(12) United States Patent
Relyea (10) Patent No.: US 8,984,424 B2
(45) Date of Patent: Mar. 17, 2015

(54) LAYOUT OF USER INTERFACE ELEMENTS

(75) Inventor: David P. Relyea, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1388 days.

(21) Appl. No.: 12/364,661

(22) Filed: Feb. 3, 2009

(65) Prior Publication Data

US 2010/0199198 A1 Aug. 5, 2010

(51) Int. Cl.
*G06F 3/00* (2006.01)
*G06F 9/44* (2006.01)

(52) U.S. Cl.
CPC .................................... *G06F 8/38* (2013.01)
USPC ............................. 715/762; 715/204; 715/243

(58) Field of Classification Search
CPC ................... G06F 8/38; G06F 17/211–17/212
USPC ......................................... 715/243, 204, 762
See application file for complete search history.

(56) References Cited

U.S. PATENT DOCUMENTS

| | | | |
|---|---|---|---|
| 4,675,830 A * | 6/1987 | Hawkins | 345/666 |
| 5,166,809 A * | 11/1992 | Surbrook | 358/1.9 |
| 5,426,729 A | 6/1995 | Parker | |
| 5,469,189 A | 11/1995 | Noguchi et al. | |
| 5,548,692 A * | 8/1996 | Cok | 715/815 |
| 6,160,549 A | 12/2000 | Touma et al. | |
| 6,456,305 B1 * | 9/2002 | Qureshi et al. | 715/800 |
| 7,177,488 B2 * | 2/2007 | Berkner et al. | 382/298 |
| 7,594,168 B2 * | 9/2009 | Rempell | 715/234 |
| 7,675,529 B1 * | 3/2010 | Brunner et al. | 345/661 |
| 7,975,231 B2 * | 7/2011 | Hasuike et al. | 715/760 |
| 8,001,465 B2 * | 8/2011 | Kudrolli et al. | 715/243 |
| 2004/0145593 A1 * | 7/2004 | Berkner et al. | 345/619 |
| 2004/0225962 A1 * | 11/2004 | Ohashi et al. | 715/517 |
| 2006/0218489 A1 * | 9/2006 | Ovetchkine et al. | 715/517 |
| 2007/0067736 A1 | 3/2007 | Aaltonen | |
| 2007/0186155 A1 * | 8/2007 | Williamson et al. | 715/518 |
| 2008/0129733 A1 | 6/2008 | Andersson | |
| 2008/0178135 A1 * | 7/2008 | Wu et al. | 716/8 |
| 2010/0185997 A1 * | 7/2010 | Allen et al. | 716/10 |
| 2013/0311910 A1 * | 11/2013 | Stambaugh | 715/760 |

OTHER PUBLICATIONS

"Layout Rounding", retrieved at <<http://msdn.microsoft.com/en-us/library/cc896566(VS.95).aspx>>, Dec. 3, 2008, pp. 2.

(Continued)

*Primary Examiner* — Ryan Pitaro
(74) *Attorney, Agent, or Firm* — Timothy Churna; Kate Drakos; Micky Minhas (57) ABSTRACT

User interface frameworks may provide an environment for developers to design and arrange user interface elements within a design layout to create a user interface. Many times UI elements comprise non-integer size values (e.g., height, width, position, etc.) due to text, user specified data, and/or centering, for example. Rendering UI elements at non-integer size values may create display artifacts because of sub-pixel rendering. Accordingly, as provided herein, a set of rules may be applied during design layout to non-integer size values to create integer size values (e.g., non-integer size values may be rounded to the nearest integer). Using integer size values in arranging UI elements within a design layout, allows undesirable display artifacts to be mitigated during rendering.

20 Claims, 10 Drawing Sheets

(56) References Cited

OTHER PUBLICATIONS

"Round Content Box", retrieved at <<http://www.webdesign.org/web/photoshop/web-layout/round-content-box.12725.html>>, Dec. 3, 2008, pp. 4.

Aaron, "Silverlight 2, RC Available", retrieved at <<http://www.wiredprairie.us/blog/index.php/archives/571>>, Sep. 26th, 2008, pp. 7.

"Change a Picture to a Rounded Rectangle, Set the Rounding Radius", retrieved at <<http://pptfaq.com/FAQ00968.htm>>, Dec. 3, 2008, pp. 3.

Ludens, Rebecca, "Corner Rounder Ideas for Scrapbooking", retrieved at <<http://scrapbooking.about.com/od/layouts/ig/Revival-of-the-Corner-Rounder/Learning-To-Ride.htm>>, Dec. 3, 2008, pp. 2.

* cited by examiner

LAYOUT OF USER INTERFACE ELEMENTS

BACKGROUND

User interface frameworks provide a development environment for user interfaces. The UI framework may render a user interface as a design layout comprising objects on a display. Some UI frameworks allow a user to manually layout objects within the design layout, while other UI frameworks provide an automatic layout of objects. For example, a user may design a user interface comprising an image, a button with text, and a label. The UI framework may automatically layout the image, the button with text, and the label within a design layout (e.g., sizes and positions may be designated). The design layout may then be rendered as pixels on a display.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for UI element design layout is disclosed herein. At least one UI element for placement within a design layout may be received. A UI element may be a button, a label, a grid, an image, a stack panel, and/or any other object that may be implemented within a user interface, for example. The design layout may be a collection of UI elements and/or respective spatial properties. For respective UI elements, a set of size values corresponding to a UI element may be determined. The set of size values may comprise width, height, centering value, origin, x offsets, y offsets, and/or any other size values of the UI element. A determination may be made as to whether size values within the set of size values are non-integer values.

For respective non-integer values, a set of rules may be applied to a non-integer value to produce an integer value. For example, a rounding rule may be applied to round the non-integer value to a nearest integer value. The non-integer value within the set of size values may be updated based upon the produced integer value (e.g., the non-integer value is replaced by the integer value).

Once respective non-integer values are updated, and then the set of size values may comprise integer values and no non-integer values. The UI elements may be arranged within the design layout based upon respective sets of size values for the UI elements. For example, an image, a label, and a stack panel may be arranged within a design layout at coordinate points (e.g., (0,0), (4,5), etc.) based upon an image set of size values, a label set of size values, and a stack panel set of size values, wherein the sets of size values comprise integer values. This allows the coordinate points to match integer values of pixels during rendering, thus mitigating rendering inconsistencies based upon non-integer values of pixels (e.g., sub-pixel rendering). The design layout may then be rendered more clearly as pixels on a display (e.g., as compared to where non-integer size values are used).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many user interface frameworks provide design layout tools to developers. The design layout tools may allow the developer to manually add and position objects within a design layout and/or may automatically position objects for the developer within the design layout. The design layout may be configured as a coordinate system, which during rendering may be mapped to pixel within a display. Display artifacts may be introduced during the design layout. These display artifacts may comprise seaming (e.g., a thin line between two adjacent rectangles), fuzzy lines due to sub-pixel rendering, and/or poor image quality.

Display artifacts may be introduced by text rendered in sub-pixels, centering causing sub-pixel rendering, and/or user specified non-integer values. Sub-pixel rendering is caused by size and/or position values of UI elements that are non-integer values. For example, a design layout tool may determine a text label is to be rendered at 60 units (e.g., pixels) wide and 12.3 units (e.g., pixels) high because the text within the text label may comprise a non-integer height. Because a display does not comprise a 12.3 pixel, but a 12 and a 13 pixel, surrounding pixels may be utilized through sub-pixel rendering to compensate.

In another example, the design layout tool may determine a black horizontal line 9 pixels wide and 1 pixel high be rendered starting at coordinates (2,2.5) and ending at coordinates (10,2.5). The non-integer pixel height may have been introduced based upon a user specified value, for example. Current techniques may shade the pixel row (2,3) to (10,3) as grey and the pixel row (2,2) to (10,2) as grey, thus compensating for the fact that there is no 2.5 pixel row upon which to display the horizontal line. This sub-pixel rendering technique creates a fuzzy line because instead of a black 1 pixel high line, a grey 2 pixel high line is rendered.

In yet another example, the design layout tool may determine a black square image 3 pixels by 3 pixels is to be centered within a stack panel 6 pixels by 6 pixels. Because the black square is to be centered at (2.5, 2.5) and there is no pixel (2.5, 2.5), the surrounding pixels may be utilized to display light grey and dark grey to compensate (e.g., pixels are now smeared across multiple pixels), thus rendering a light grey/dark grey square 4 pixels by 4 pixels. The black square image may be rendered as having poor image quality (e.g., fuzzy and/or discolored).

The rendering problems introduced by text, centering, and/or user specified data may become worse when the size of a UI element is dependant on another UI element's size. For example, a stack panel may comprise three buttons with text. If the text of the respective buttons have non-integer size values, then the non-integer size values may be propagated to the buttons and/or the stack panel.

Instead of sub-pixel rendering, some techniques employ pixel snapping at the rendering level (e.g., low level graphics API). Providing pixel snapping at the rendering level may use additional system resources. For example, communication may be needed between different layers of architecture that do not normally and/or naturally communicate. This provides a sub-optimal solution for UI frameworks.

As provided herein, a technique for UI element design layout. This technique mitigates display artifacts (e.g., poor image quality, fuzzy lines, and/or seaming caused by sub-pixel rendering of non-integer pixel values for UI elements) introduced during layout. The non-integer pixel values may be introduced because of user specified data, text, and/or centering. A UI element that is to be arranged within a design layout may comprise a set of size values (e.g., height, width, centering value, offsets, etc.). If the set of size values comprises non-integer values, then a set of rules may be applied to the non-integer values to produce integer values. Once the set of size values is updated to comprise integer values and not non-integer values, then the UI element may be arranged within the design layout. Because the UI elements are arranged using integer size values, the use of sub-pixel rendering is mitigated. This technique may be employed for multiple nested UI elements (e.g., text, a button comprising the text, a stack panel comprising the button, etc.).

It may be appreciated that the technique may be implemented within the design layout layer of the architecture and is not bound to low level rendering layers. For example, the design layout technique may be integrated into a design layout system used in automatic design layout. This may mitigate the resources used for communication between a design layout system and a low level rendering layer.

Figure 1:
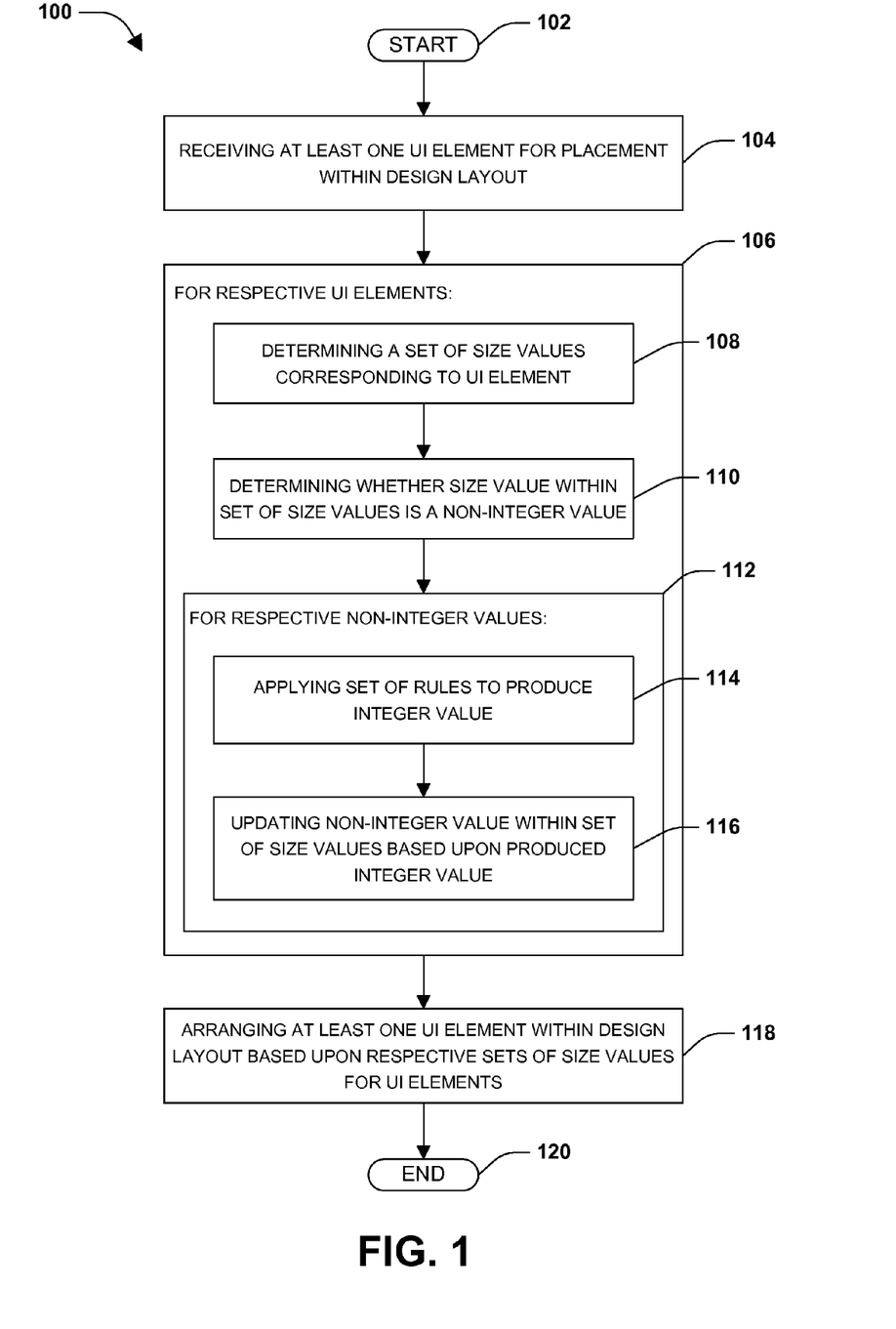
FIG. 1 is a flow chart illustrating an exemplary method of UI element design layout.

One embodiment of UI element design layout is illustrated by an exemplary method 100 in FIG. 1. At 102, the method begins. At 104, at least one UI element for placement within a design layout is received. For example, a UI element may be a button, an image, a stack panel, a label, a drawing object, etc. that may be arranged within the design layout. The design layout may comprise a coordinate system in which UI elements may be arranged based upon size values. The design layout may be presented as a user interface by rendering the design layout as pixels on a display.

At 106, for respective UI elements, a set of size values corresponding to a UI element is determined, at 108. The set of size values may comprise height, width, padding, margin, and/or other size values corresponding to the UI element. The set of size values may be based upon user specified values, automatically generated values, and/or child size values of nested child UI elements. For example, a user may designate a width and margin size value for a button UI element. A height size value and a centering value may be automatically determined for the button UI element. The set of size values may be adjusted based upon properties of the UI element. For example, additional factors such as text, boarders, character count, and/or other properties of a UI element may be taken into account.

Within the set of size values, a centering value may be determined because centering may cause display artifacts. For example, centering an image with odd valued dimensions within a space with even valued dimensions may produce a non-integer valued centering value. The centering value may comprise a horizontal centering value and/or a vertical centering value.

At 110, a determination is made as to whether a size value within the set of size values is a non-integer value. Non-integer values may cause sub-pixel rendering leading to display artifacts. At 112, for respective non-integer values, a set of rules are applied to a non-integer value to produce an integer value, at 114. In one example, a set of rules may comprise rounding the non-integer value to the nearest integer value (e.g., rounding 10.5 to 11, rounding 10.30.10, etc.). At 116, the non-integer value within the set of size values may be updated based upon the produced integer value (e.g., the integer value replaces the non-integer value).

At 118, the UI elements may be arranged within a design layout based upon respective sets of size values for the UI elements (e.g., an automatic arrangement, a manual arrangement, etc.). The sets of size values comprise integer values, thus the UI elements may be arranged at integer coordinate values of the design layout. Display artifacts from sub-pixel rendering may be mitigated because the integer coordinate values of the design layout may match integer pixels during rendering of the display layout on a display. The design layout may be presented within a window, user interface, web browser, web browser plug-in, etc. At 120, the method ends.

It may be appreciated that a recursive technique may be employed in determining a set of size values. A UI element (a parent UI element) may comprise one or more nested UI elements (child UI elements). The size and position of the child UI elements may affect the set of size values of the parent. For example, a stack panel (a parent UI element) may comprise three button UI elements (children UI elements). The set of size values corresponding to the stack panel may depend upon a set of child UI size values. Because the set of child UI size values may comprise non-integer values, a set of rules may be applied to produce integer values. The non-integer values may be updated with the produced integer values, thus the set of child UI size values may comprise integer values and no non-integer values. Because multiple nesting of UI elements may occur, the UI elements may be received within a tree structure comprising parent UI elements and/or respective child UI elements. The tree structure may comprise UI elements that are to be placed within the design layout. It may be appreciated that a parent UI element may be a child UI element of another UI element.

Figure 2:
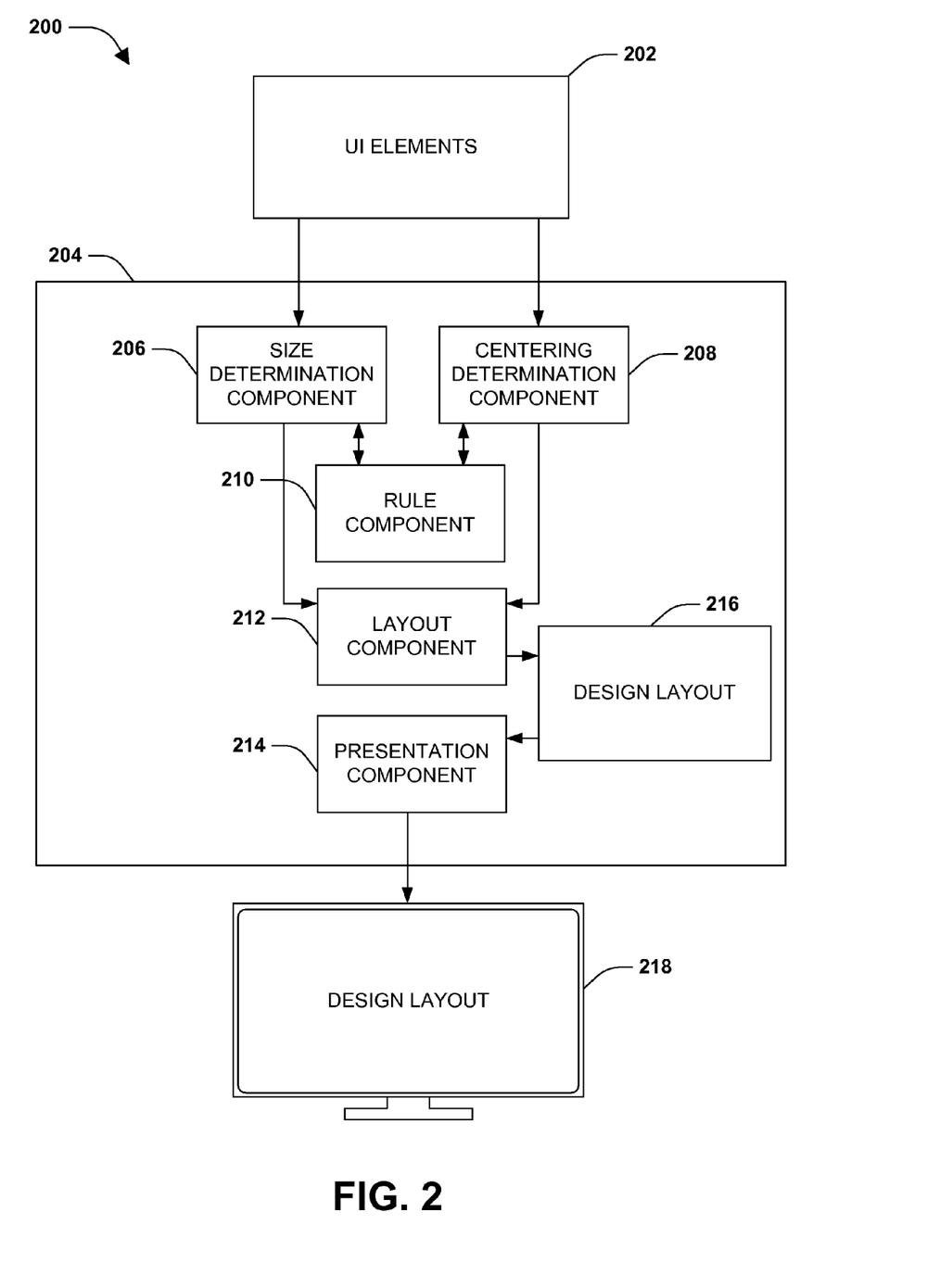
FIG. 2 is a component block diagram illustrating an exemplary system for UI element design layout.

FIG. 2 illustrates an example 200 of a system 204 configured for UI element design layout. The system 204 may comprise a size determination component 206, a rule component 210, and a layout component 212. The system 204 may further comprise a centering determination component 208 and a presentation component 214. The system 204 may be configured to arrange UI elements 202 within a design layout 216 which may be presented by rendering the design layout 216 through pixels on a display 218.

The size determination component 206 may be configured to receive at least one UI element 202 that is to be placed within the design layout 216. For example, a tree structure comprising parent UI elements and respective child UI elements may be received. In another example, a single UI element may be received. For respective UI elements 202, the size determination component 206 may determine a set of size values corresponding to the UI elements.

The size determination component 206 may determine whether a size value within the set of size values is a non-integer value. For respective non-integer values, the size determination component 206 may request the rule component 210 to update the non-integer value based upon a produced integer value. If nested UI elements were received, then the size determination component 206 may determine a set of child UI size values for respective child UI elements. The size determination component 206 may determine whether a size value within the set of child UI size values is a non-integer value. For respective non-integer values, the size determination component 206 may request the rule component 210 to update the non-integer value based upon a produced child UI integer value (e.g., the rule component 210 applies a set of rules, such as rounding to the nearest integer, to the non-integer value to produce an integer value).

The centering determination component 208 may be configured to determine a centering value (e.g., a horizontal centering value, a vertical centering value) corresponding to a UI element (e.g., parent UI element, child UI element, etc.). The centering value may be determined from the set of size values, user specified data, automatically generated data, and/or other information regarding the UI element. The centering value may be determined because centering a UI element may produce non-integer values leading to sub-pixel rendering which may cause display artifacts. If the centering value is a non-integer value, then the centering determination component 208 may request the rule component 210 to update the non-integer value based upon a produced integer value. For example, the rule component 210 may apply a set of rules, such as rounding to the nearest integer, to produce an integer value. The non-integer value may be replaced with the integer value, thus updating the centering value to an integer value. The centering component 208 may request the layout component 212 to arrange the UI elements within the design layout 216 based upon respective centering values for the UI elements.

The rule component 210 may be configured to apply a set of rules to a non-integer value to produce an integer value. The non-integer value may correspond to a size value within a set of size values and/or a centering value. In one example, the rule component 210 may round the non-integer to the nearest integer value. It may be appreciated that the set of rules may be any set of rules that produces an integer value. The rule component 210 may be configured to update the non-integer value based upon the produced integer value, thus updating a centering value and/or a size value to an integer value, for example.

The layout component 212 may be configured to arrange at least one UI element within the design layout 216 based upon respective sets of size values and/or centering values of the UI elements. It may be appreciated that the UI elements may be arranged using integer values corresponding to integer valued coordinates within the design layout 216.

The presentation component 214 may be configured to present the design layout 216. The design layout 216 may be presented within a user interface, a window, a web browser, a web browser plug-in, etc. Because UI elements may be arranged at integer valued coordinates, the design layout 216 may be rendered at corresponding integer valued pixels of a display. This may mitigate sub-pixel rendering that may cause display artifacts.

Figure 3:
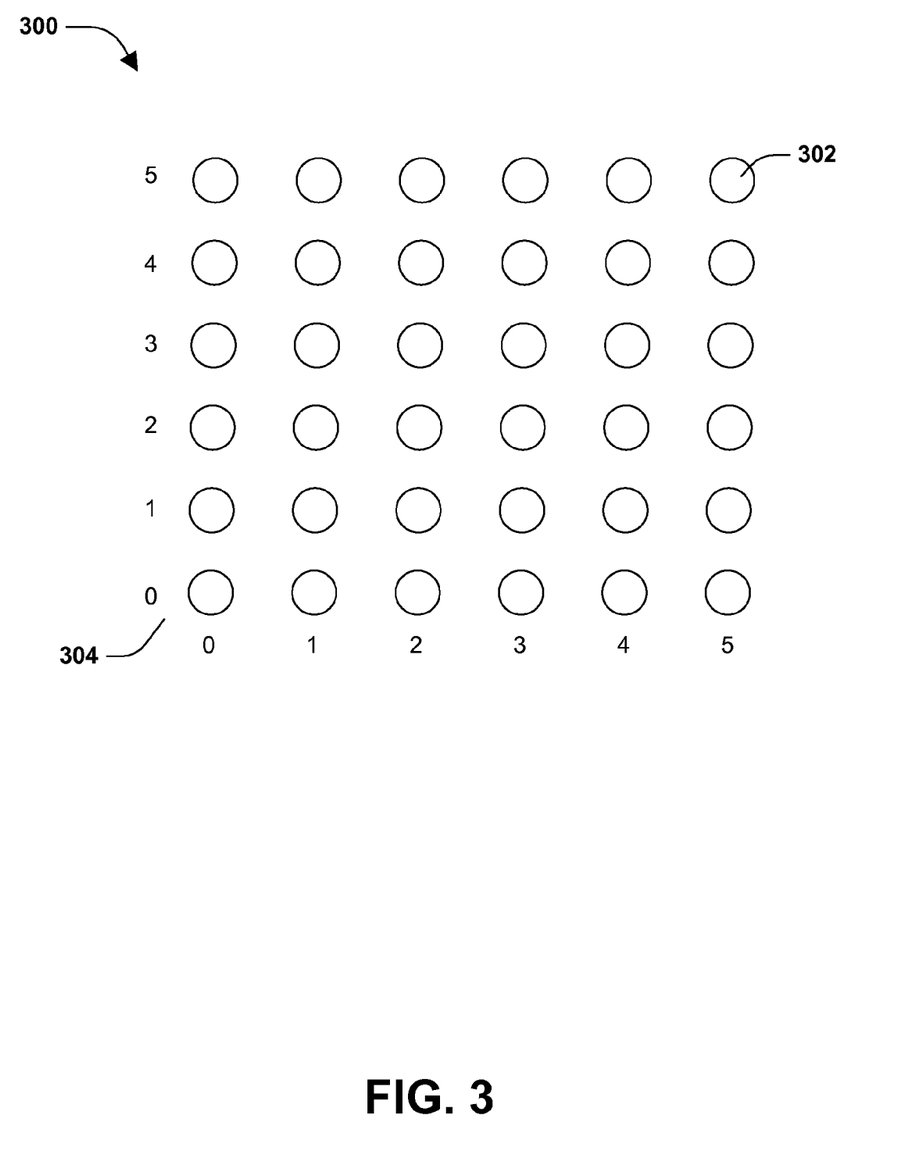
FIG. 3 is an illustration of an example of a coordinate system.

FIG. 3 illustrates an example 300 of a coordinate system 304. The coordinate system 304 may comprise integer valued coordinate points. It may be appreciated that the integer valued coordinate points may be interpreted as pixels (e.g., a pixel 302). A design layout comprising UI elements may be arranged within the coordinate system 304. The arranged design layout may be rendered on a display comprising pixels corresponding to the integer valued coordinate points of the coordinate system 304. The display may comprise integer valued pixels and no non-integer valued pixels. For example, a pixel may not physically exist corresponding to a coordinate point (2.3,5) because the display does not comprise a 2.3 non-integer pixel for rendering.

Figure 4:
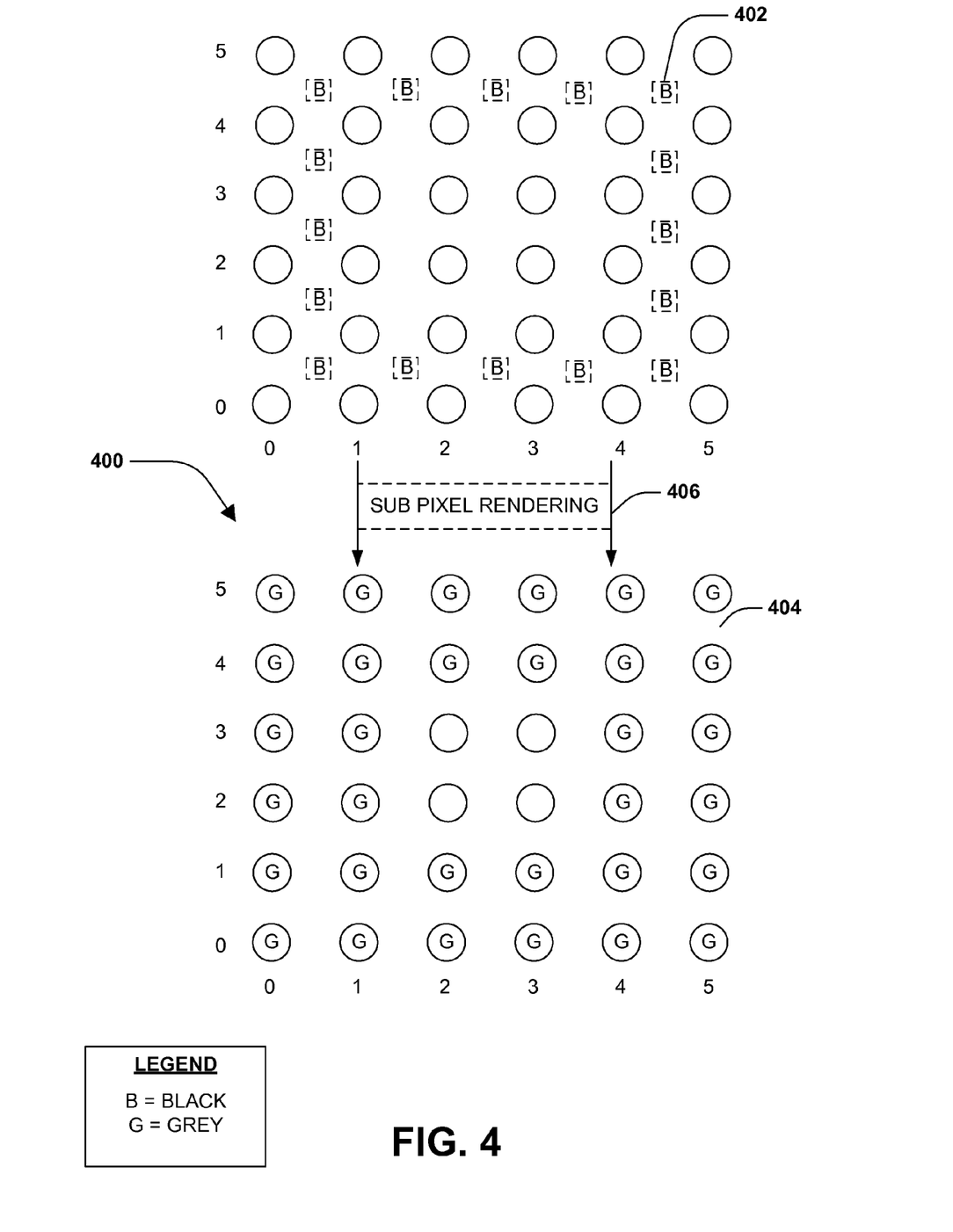
FIG. 4 is an illustration of an example of sub-pixel rendering.

FIG. 4 illustrates an example 400 of sub-pixel rendering. It may be appreciated B represents black and G represents grey. A black square object 402 (e.g., a UI element) is arranged within a display layout (e.g., a 6 by 6 coordinate grid). The black square object 402 may comprise a set of size values: a width of 5 pixels, a height of 5 pixels, a thickness of 1 pixel, and a starting position of (0.5,0.5). The set of size values may be user specified and/or automatically determined based upon properties of the black square object 402. Sub-pixel rendering 406 may be used to present the display layout comprising the black square object 402 within a display because the black square object 402 is arranged using non-integer size values (e.g., the line from (0.5,0.5) to (4.5,0.5). The sub-pixel rendering 406 may cause display artifacts because the sub-pixel rendering 406 may compensate for the non-integer values may using surrounding pixels.

The sub-pixel rendering 406 may render the black square object 402 as a grey square object 404 using surrounding pixels. The grey square object 404 is 6 pixels wide, 6 pixels high, 2 pixels thick, and has a starting position at (0,0). The difference between the black square object 402 and the rendered grey square object noticed in color, fuzziness, image quality, seaming, etc. The undesirable rendering differences caused by sub-pixel rendering may become more apparent as more UI elements within a design layout are rendered using sub-pixel rendering because of non-integer size values.

In another example, a horizontal black line may be arranged at (2,4.5) to (4,4.5). Because there are no 4.5 non-integer pixels within a display, sub-pixel rendering may render the horizontal black line as a first grey line from (2,4) to (4,4) and a second grey line from (2,5) to (4,5). The horizontal black line is rendered as a 2 pixel thick horizontal grey line, which may cause undesirable display artifacts.

Figure 5:
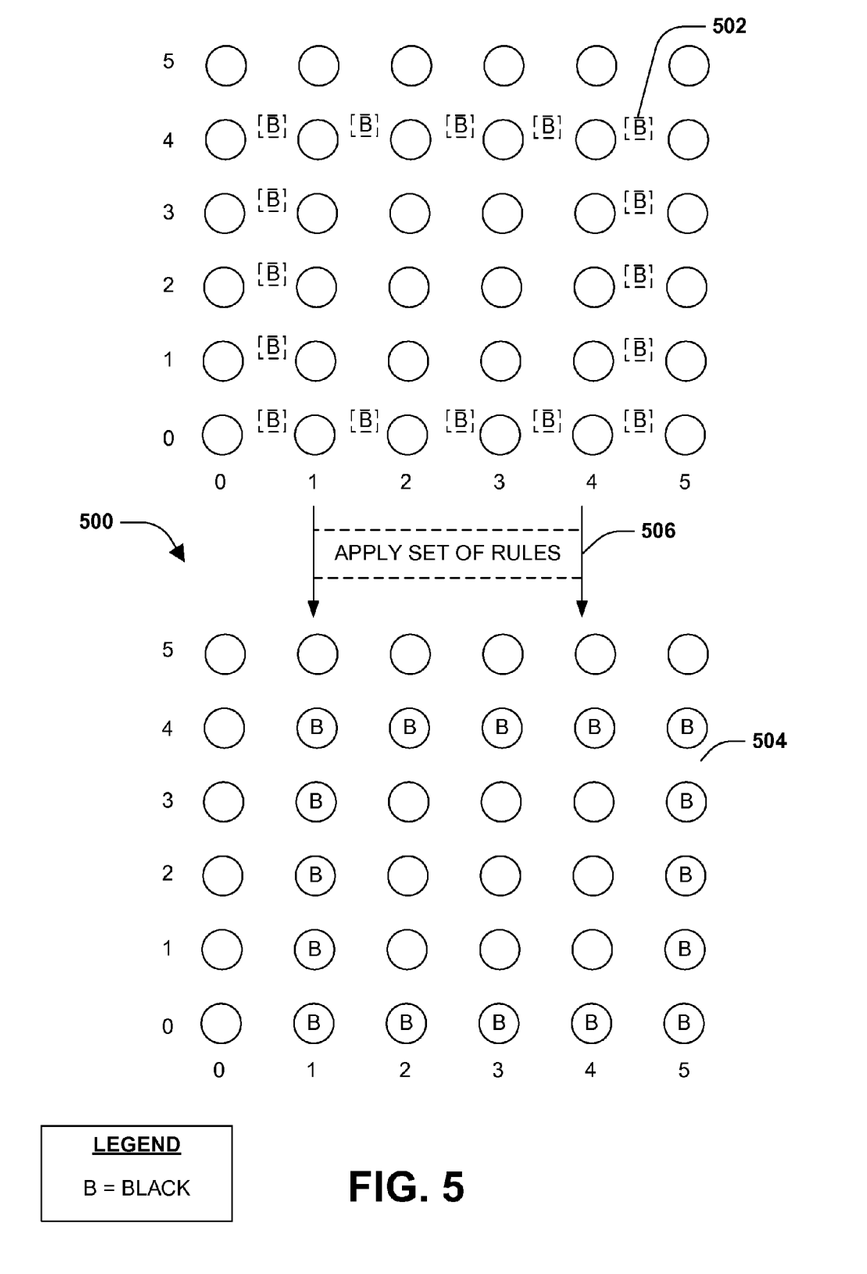
FIG. 5 is an illustration of an example of UI element design layout based upon arranging UI elements using integer size values.

FIG. 5 illustrates an example 500 of UI element design layout based upon arranging UI elements using integer size values. It may be appreciated B represents black. A black square object 502 (e.g., a UI element) is to be arranged within a design layout (e.g., a 6 by 6 coordinate grid). The black square object 502 may comprise a set of size values: a width of 5 pixels, a height of 5 pixels, a thickness of 1 pixel, and a centering value at (2.5,2.3). A determination may be made as to whether size values within the set of size values are non-integer values. Because there are non-integer size values (e.g., the centering value at 2.5 and 2.3), a set of rules 506 may be applied to the non-integer size values to produce integer values. For example, the 2.5 may be rounded to 3 and the 2.3 may be rounded to 2. The non-integer centering values may be updated with the 2 (vertical centering value) and the 3 (horizontal centering value).

The black square object 502 is arranged within the design layout at integer coordinate points. The black square object 502 may be rendered within a display using integer pixels without sub-pixel rendering because the black square object 502 was not arranged using non-integer size values. This may mitigate display artifacts from sub-pixel rendering (e.g., fuzziness and/or poor image quality of the black square object 504) because the integer coordinate points may correspond to integer pixels of the display.

Figure 6:
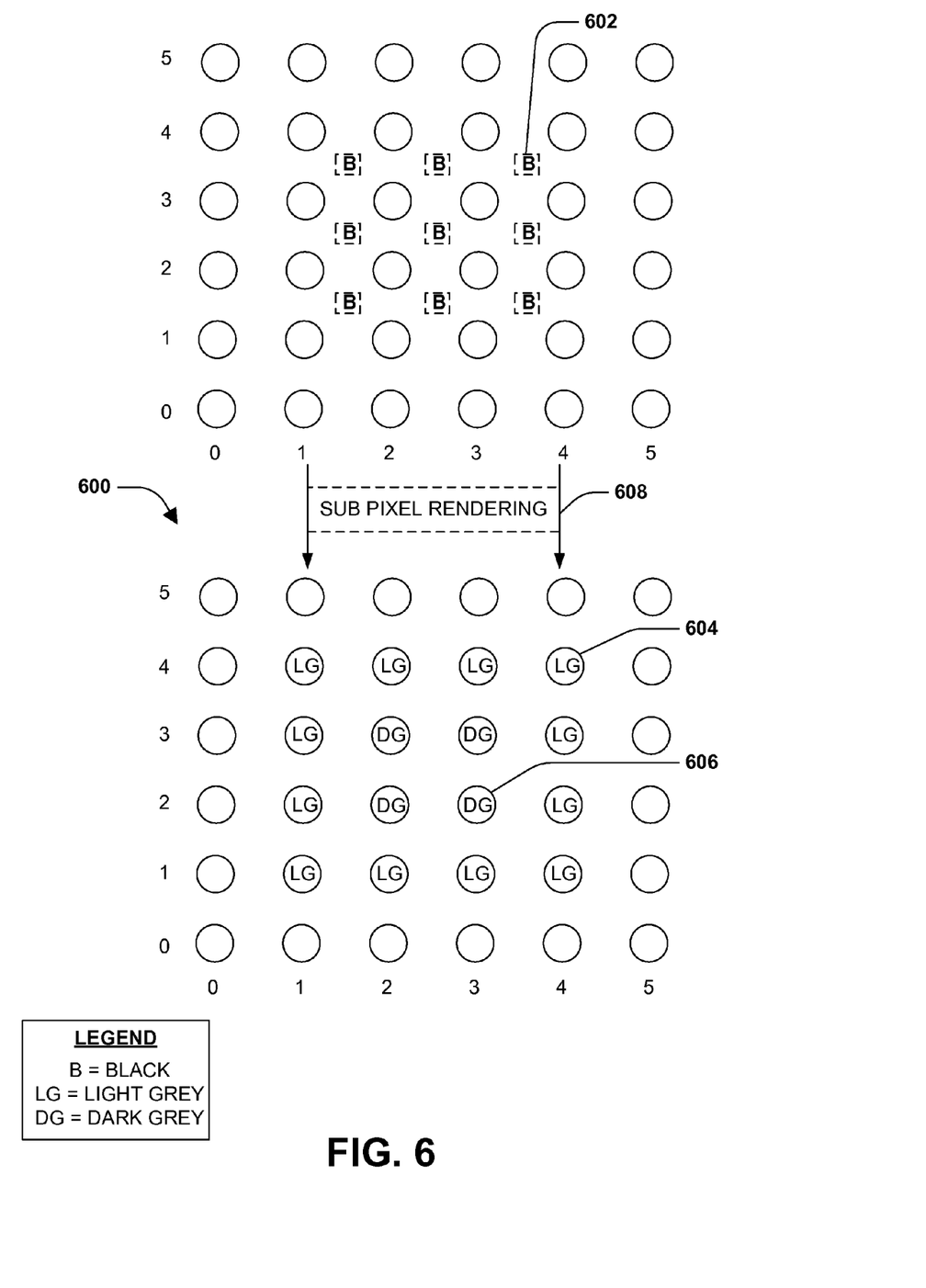
FIG. 6 is an illustration of an example of sub-pixel rendering.

FIG. 6 illustrates an example 600 of sub-pixel rendering. It may be appreciated B represents black, LG represents light grey, and DG represents dark grey. A solid black square image 602 (e.g., a UI element) is arranged within a display layout (e.g., a 6 by 6 coordinate grid). The solid black square image 602 may comprise a set of size values: a width of 3 and a height of 3. The solid black square image 602 is centered within the display layout. Sub-pixel rendering 608 may be used to present the display layout comprising the centered solid black square image 602 within a display because the centered solid black square image 602 is arranged using non-integer size values.

It may be appreciated that centering a UI element comprising even coordinates within a space comprising odd coordinates may produce non-integer size values. Furthermore, centering a UI element with odd coordinates within a space comprising even coordinates may produce non-integer size values. But, if a UI element and a space both have odd or even coordinates, then integer values may be produced.

The sub-pixel rendering 608 may render the solid black square image 602 as a dark grey and light grey square image (e.g., light grey pixels 604 and dark grey pixels 606) to create an appearance of the solid black square image 602. Undesirable differences may be apparent between the solid black square image 602 and the rendered dark grey and light grey square image. For example, the new square image has the appearance of being centered at (2.5,2.5), but may appear fuzzy, off colored, and/or having poor image quality because there are no non-integer pixels to render the non-integer size values.

Figure 7:
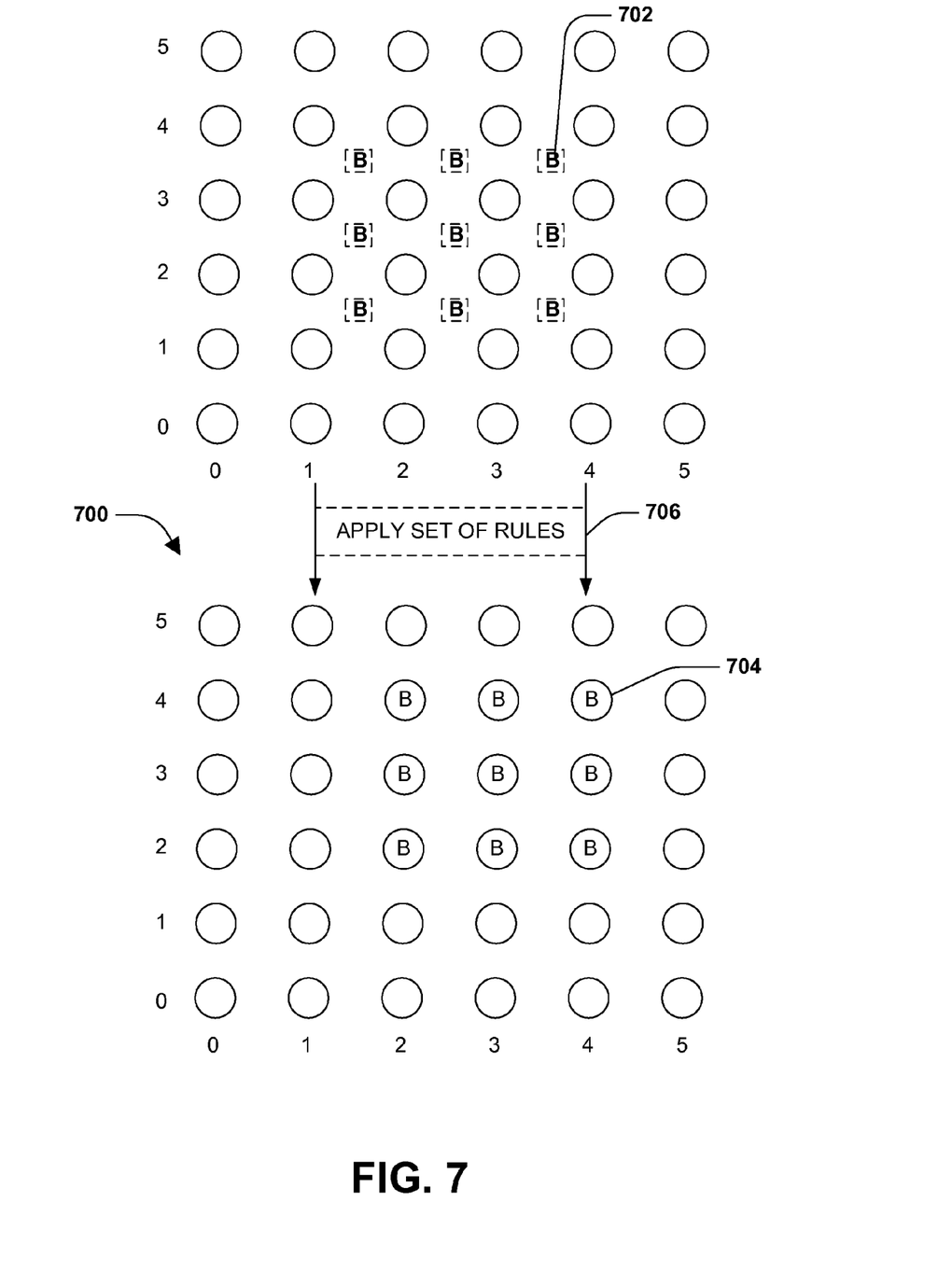
FIG. 7 is an illustration of an example of UI element design layout based upon arranging UI elements using integer size values.

FIG. 7 illustrates an example 700 of arranging a solid black image 702 centered within a display layout based upon integer size values. It may be appreciated D represents black. The solid black square image 702 (e.g., a UI element) is to be centered within the display layout (e.g., a 6 by 6 coordinate gird). The solid black square image 702 may comprise a set of size values: a width of 3, a height of 3, and a centering value of (2.5, 2.5). A determination may be made as to whether size values within the set of size values are non-integer values. The centering value comprises non-integer values because the odd valued solid black square image 702 is centered within an even valued display layout. A set of rules 706 may be applied to the non-integer size values to produce integer values. For example, the 2.5 may be rounded to 3 and the 2.5 may be rounded 3. The non-integer centering values may be updated with the 3 (vertical centering value) and the 3 (horizontal centering value). The solid black square image 704 may be arranged within the display layout using the updated centering position. The solid black square image 704 is arranged at integer valued coordinate points that may be rendered at corresponding integer valued pixels on a display.

Figure 8:
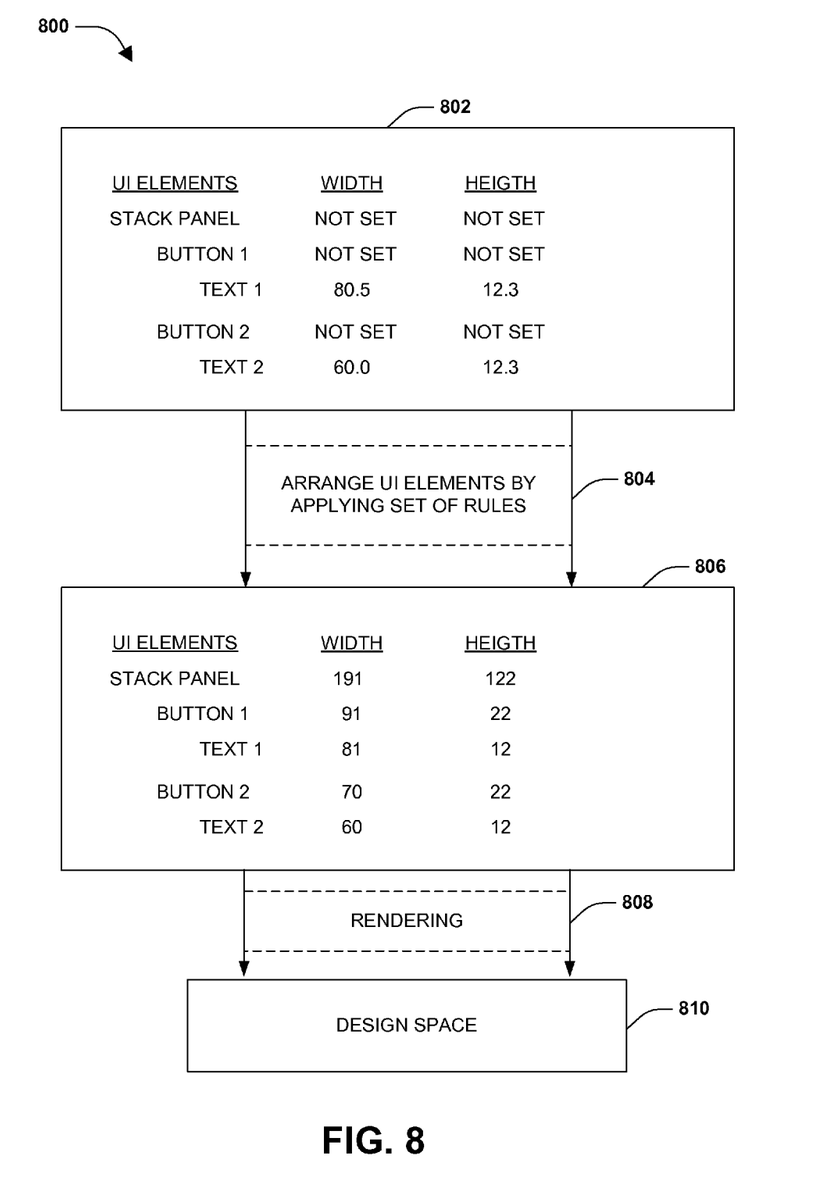
FIG. 8 is an illustration of an example of UI element design layout based upon arranging UI elements using integer size values.

FIG. 8 illustrates an example 800 of a set of UI elements 802 that are to be arranged within a design layout and rendered within a design space 810. A set of size values corresponding to respective UI elements within the set of UI elements 802 may be determined. For example, the text (1) UI element has user specified width and height values, which are determined to be non-integer values. The text (1) UI element is a child UI element of the button (1) UI element and the stack panel UI element, thus the non-integer values may propagate to respective size values of the button (1) UI element and the stack panel UI element.

A set of rules 804 may be applied to the non-integer values to produce integer values. For example, the width 80.5 may be rounded to 81 and the height 12.3 may be rounded to 12, thus creating integer values. The non-integer size values of the text (1) UI element may be updated with the integer values.

This technique may be recursively performed upon respective UI elements within the set of UI elements 802 to produce an updated set of UI elements 806 comprising integer size values. The integer size values may be used to arrange the UI elements within the design layout. The design layout comprising the arranged updated set of UI elements 806 may be rendered 808 (e.g., presented) within the design space 810.

Figure 9:
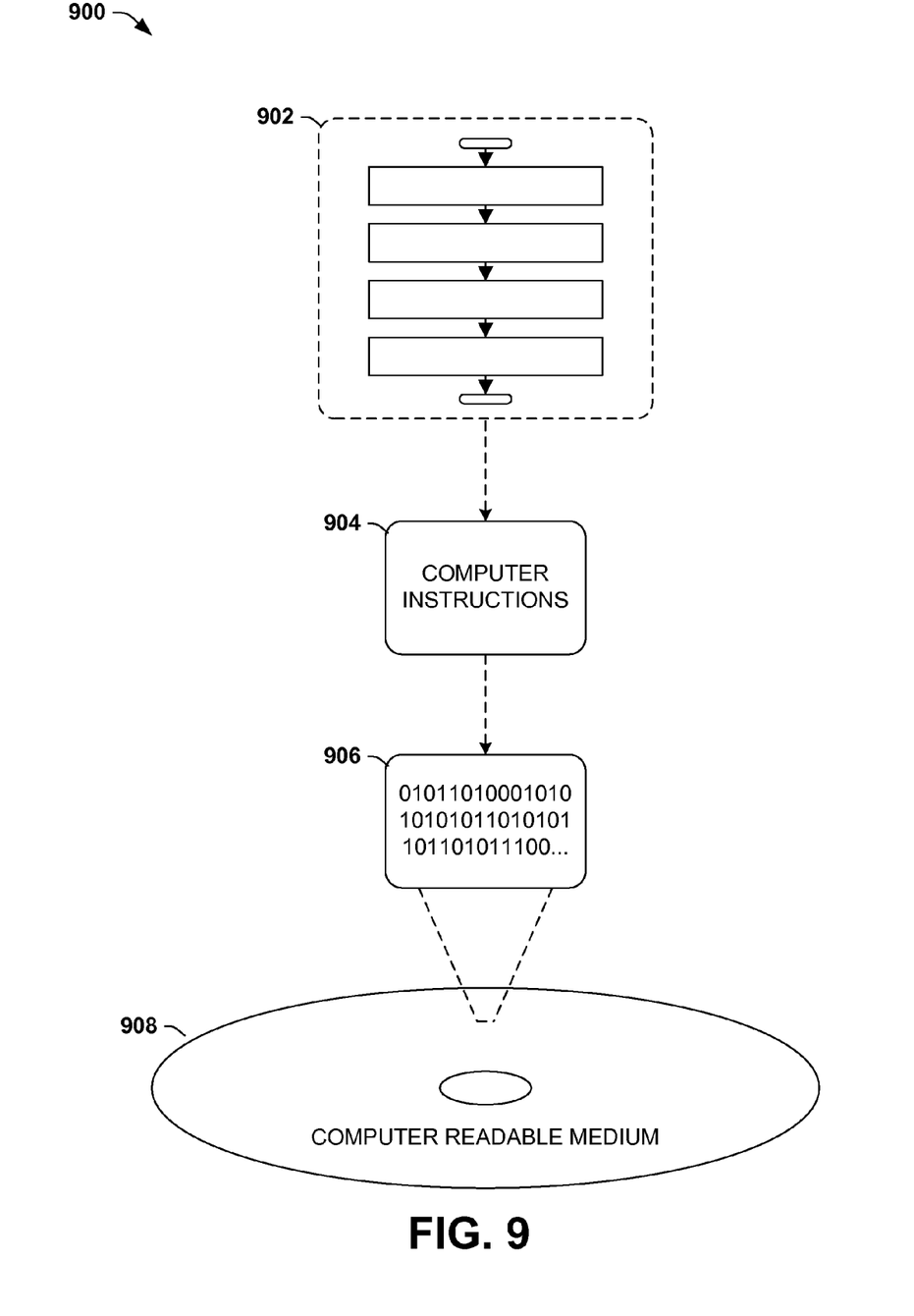
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 902 configured to operate according to one or more of the principles set forth herein. In one such embodiment 900, the processor-executable instructions 902 may be configured to perform a method, such as the exemplary method 100 of FIG. 1, for example. In another such embodiment, the processor-executable instructions 914 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
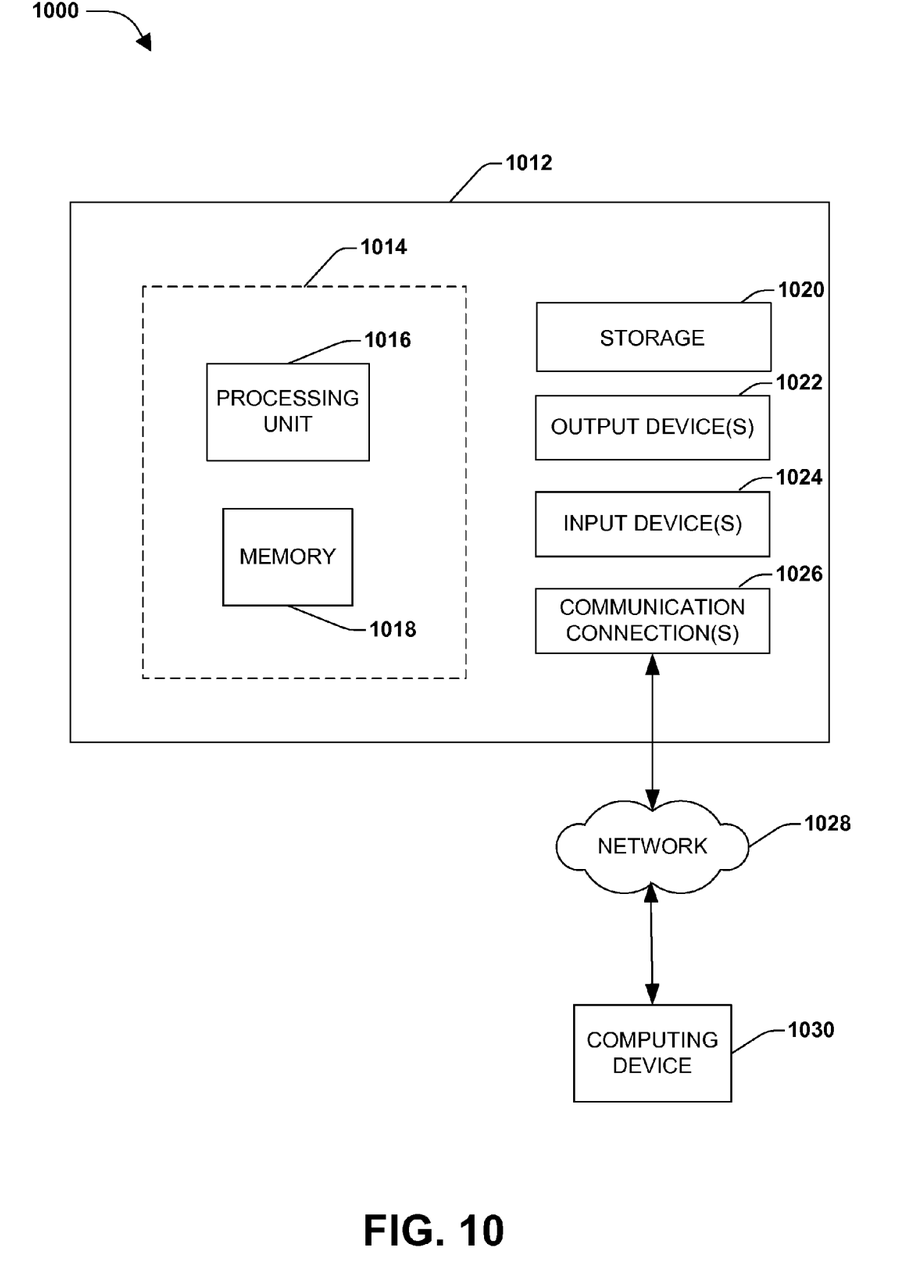
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for arranging a user interface (UI) element within a user interface design form in a user interface programming environment at design time, comprising:
   responsive to a developer placing a UI element within a user interface design form in a user interface programming environment at design time:
      identifying a non-integer size value corresponding to the UI element, the non-integer size value comprising a non-scaled value specified at design time;
      applying a set of rules to the non-integer size value to produce an integer value; and
      updating the non-integer size value with the integer value to create an updated integer size value; and
   arranging the UI element within the user interface design form at design time based upon the updated integer size value, the arranging not bound to a low level rendering layer.

2. The method of claim 1, comprising:
   calculating a centering parameter for the UI element based upon a horizontal centering parameter and a vertical centering parameter;
   identifying the centering parameter as comprising a non-integer centering value;
   applying the set of rules to the non-integer centering value to produce an integer centering value; and
   updating the centering parameter with the integer centering value to create an updated centering parameter.

3. The method of claim 2, comprising:
   arranging the UI element within the user interface design form based upon the updated centering parameter.

4. The method of claim 1, comprising:
   determining that the UI element comprises a child UI element;
   identifying a child non-integer size value corresponding to the child UI element;
   applying the set of rules to the child non-integer size value to produce a child integer value; and
   updating the child non-integer size value with the child integer value to create an updated child integer size value.

5. The method of claim 4, comprising:
   arranging the child UI element within the user interface design form at design time based upon the updated child integer size value.

6. The method of claim 1, the non-integer size value comprising at least one of a width size value, a height size value, a margin size value, or a padding size value.

7. The method of claim 1, the non-integer size value comprising a non-user specified size value.

8. The method of claim 1, the non-integer size value comprising a user specified size value.

9. The method of claim 1, the set of rules comprising a rounding rule that rounds a non-integer value to a nearest integer value.

10. The method of claim 4, comprising:
    creating a tree comprising the UI element and the child UI element.

11. A system for arranging a user interface (UI) element within a user interface design form in a user interface programming environment at design time, comprising:
    one or more processing units; and
    memory comprising instructions that when executed by at least one of the one or more processing units perform operations comprising:
       responsive to a developer placing a UI element within a user interface design form in a user interface programming environment at design time:
          identifying a non-integer size value corresponding to the UI element, the non-integer size value comprising a non-scaled value specified at design time;
          applying a set of rules to the non-integer size value to produce an integer value; and
          updating the non-integer size value with the integer value to create an updated integer size value; and
       arranging the UI element within the user interface design form at design time based upon the updated integer size value, the arranging not bound to a low level rendering layer.

12. The system of claim 11, the operations comprising:
    calculating a centering parameter for the UI element based upon a horizontal centering parameter and a vertical centering parameter;
    identifying the centering parameter as comprising a non-integer centering value;
    applying the set of rules to the non-integer centering value to produce an integer centering value; and
    updating the centering parameter with the integer centering value to create an updated centering parameter.

13. The system of claim 12, the operations comprising:
    arranging the UI element within the user interface design form based upon the updated centering parameter.

14. The system of claim 11, the set of rules comprising a rounding rule that rounds a non-integer value to a nearest integer value.

15. The system of claim 11, the operations comprising:
determining that the UI element comprises a child UI element;
identifying a child non-integer size value corresponding to the child UI element;
applying the set of rules to the child non-integer size value to produce a child integer value; and
updating the child non-integer size value with the child integer value to create an updated child integer size value.

16. The system of claim 15, the operations comprising:
arranging the child UI element within the user interface design form at design time based upon the updated child integer size value.

17. A computer-readable storage device comprising instructions that when executed perform a method for arranging a user interface (UI) element within a user interface design form in a user interface programming environment at design time, comprising:
responsive to a developer placing a UI element within a user interface design form in a user interface programming environment at design time:
identifying a non-integer size value corresponding to the UI element, the non-integer size value comprising a non-scaled value specified at design time;
applying a set of rules to the non-integer size value to produce an integer value; and
updating the non-integer size value with the integer value to create an updated integer size value; and
arranging the UI element within the user interface design form at design time based upon the updated integer size value, the arranging not bound to a low level rendering layer.

18. The computer-readable storage device of claim 17, comprising:
calculating a centering parameter for the UI element based upon a horizontal centering parameter and a vertical centering parameter;
identifying the centering parameter as comprising a non-integer centering value;
applying the set of rules to the non-integer centering value to produce an integer centering value; and
updating the centering parameter with the integer centering value to create an updated centering parameter.

19. The computer-readable storage device of claim 18, comprising:
arranging the UI element within the user interface design form based upon the updated centering parameter.

20. The computer-readable storage device of claim 17, the set of rules comprising a rounding rule that rounds a non-integer value to a nearest integer value.

* * * * *